United States Patent
Zhang et al.

(10) Patent No.: US 10,803,393 B2
(45) Date of Patent: Oct. 13, 2020

(54) SYSTEM AND METHOD FOR PERFORMANCE EVALUATION OF PROBABILITY FORECAST

(71) Applicant: FinancialSharp, Inc., Brooklyn, NY (US)

(72) Inventors: Xiaoping Zhang, Toronto (CA); David Kedmey, Brooklyn, NY (US); Fang Wang, Toronto (CA)

(*) Notice: Subject to any disclaimer, the term of this patent is extended or adjusted under 35 U.S.C. 154(b) by 839 days.

(21) Appl. No.: 15/478,910

(22) Filed: Apr. 4, 2017

(65) Prior Publication Data

US 2017/0286840 A1 Oct. 5, 2017

Related U.S. Application Data

(60) Provisional application No. 62/317,774, filed on Apr. 4, 2016.

(51) Int. Cl.
| | | |
|---|---|---|
| *G06N 5/04* | (2006.01) | |
| *G06N 5/02* | (2006.01) | |
| *G06F 17/18* | (2006.01) | |
| *G06N 7/00* | (2006.01) | |

(52) U.S. Cl.
CPC ............ *G06N 5/04* (2013.01); *G06F 17/18* (2013.01); *G06N 5/02* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 2015/0286955 A1* | 10/2015 | Virkar | ............... | G06N 20/00 706/12 |
| 2016/0187199 A1* | 6/2016 | Brunk | ............... | G01J 3/2823 348/89 |
| 2017/0243317 A1* | 8/2017 | Rodriguez | ............... | G06F 21/16 |

OTHER PUBLICATIONS

Weijs et al., Kullback-Leibler Divergence as a Forecast Skill Score with Classic Reliability-Resolution-Uncertainty Decomposition, Department of Water Resources Management, Delft University of Technology, Sep. 2010, pp. 3387-3399 (Year: 2010).*

Jiang et al., Clustering Uncertain Data Based on Probability Distribution Similarity, IEEE Transactions on Knowledge and Data Engineering, vol. 25, No. 4, Apr. 2013, pp. 751-763 (Year: 2013).*

* cited by examiner

*Primary Examiner* — Alan Chen
(74) *Attorney, Agent, or Firm* — K&L Gates LLP

(57) ABSTRACT

A method and system for probability distribution forecast evaluation are disclosed. The present disclosure is directed to embodiments of a system that evaluates probability distribution forecasts by acquiring one or more of a probability distribution forecast, a probability distribution realization, and a prior knowledge of the probability distribution forecast. The system disclosed herein may then compute an accuracy score and an information score based on the acquired forecast, realization, and prior knowledge. In evaluating the forecast, a performance score may also be computed based on the accuracy score and the information score.

26 Claims, 2 Drawing Sheets

SYSTEM AND METHOD FOR PERFORMANCE EVALUATION OF PROBABILITY FORECAST

PRIORITY CLAIM

This application claims priority to and the benefit of U.S. Provisional Patent Application Ser. No. 62/317,774, filed on Apr. 4, 2016, which is incorporated here in its entirety.

TECHNICAL FIELD

The present application relates in general to evaluating probability distribution forecasts. More specifically, the present application refers to a system and method for evaluating probability distribution forecasts by computing an accuracy score and an information score and further computing a performance score based on the accuracy score and information score.

BACKGROUND

Modern forecasting techniques and technologies have resulted in a large number of forecasts and predictions across a variety of industries and applications. The widespread availability of such forecasts enables businesses, groups, and individuals to better plan their behavior and generally prepare for the future. However, these forecasts are only useful to the extent they are accurate. It is therefore important for users of these forecasts to have a way to evaluate these forecasts.

The large number of available forecasts and large number of predictions inherent in each forecast means that any forecast evaluation must be systematic and repeatable between multiple forecasts. Existing forecast evaluation strategies focus primarily on the forecasts' accuracy, or how far the forecast's predictions tend to be from what actually happens. However, focusing on accuracy alone fails to measure whether the forecast provides more information than what is already available. A forecast that provides more information may be more useful even if it is less accurate. For example, a forecast that tells you it rains on 30% of the days in July may be highly accurate. However, a forecast that predicts an 80% chance of rain tomorrow may be much more useful, even if it is inaccurate and there is actually a 90% chance of rain tomorrow. Therefore, a forecast evaluation strategy that takes into account both a forecast's accuracy and the additional information it provides is needed.

SUMMARY

A system and method to enable probability distribution forecast evaluation are disclosed. The probability distribution forecast evaluation system comprises at least one processor and at least one memory device. The at least one memory device may store a plurality of instructions which, when executed by the at least one processor, cause the at least one processor to operate with the at least one memory device to acquire one or more of a probability distribution forecast, a probability distribution realization corresponding to the probability distribution forecast, and a prior knowledge of the probability distribution forecast; compute an accuracy score based on the one or more of a probability distribution forecast, a probability distribution realization corresponding to the probability distribution forecast, and a prior knowledge of the probability distribution forecast; compute an information score based on the one or more of a probability distribution forecast, a probability distribution realization corresponding to the probability distribution forecast, and a prior knowledge of the probability distribution forecast; and compute a performance score based on the accuracy score and the information score.

The accuracy score may be computed based on the probability distribution forecast and the probability distribution realization. The accuracy score may further be computed by calculating a dissimilarity score between the probability distribution forecast and the probability distribution realization. The probability distribution forecast evaluation system may calculate a dissimilarity score that is either (1) the Kullback-Leibler (KL) divergence between the probability distribution forecast and the probability distribution realization, or (2) a quadratic approximation of the KL divergence between the probability distribution forecast and the probability distribution realization.

The probability distribution forecast evaluation system may compute the information score based on the probability distribution realization and the prior knowledge of the probability distribution forecast. The information score may be computed by calculating a dissimilarity score between the probability distribution realization and the prior knowledge of the probability distribuion forecast. The probability distribution forecast evaluation system may calculate a dissimilarity score that is either (1) the Kullback-Leibler (KL) divergence between the probability distribution realization and the prior knowledge of the probability distribution forecast, or (2) a quadratic approximation of the KL divergence between the probability distribution realization and the prior knowledge of the probability distribution forecast.

The probability distribution forecast evaluation system may compute the performance score by subtracting the accuracy score from the information score. Further, one or more of the probability distribution forecast, the probability distribution realization corresponding to the probability distribution forecast, and the prior knowledge of the probability distribution forecast are computed based on samples. Still further, one or more of the probability distribution forecast, the probability distribution realization corresponding to the probability distribution forecast, and the prior knowledge of the probability distribution forecast may be partitioned into discrete probability bins. In some embodiments, one or more of the probability distribution forecast, the probability distribution realization corresponding to the probability distribution forecast, and the prior knowledge of the probability distribution forecast contain sample errors and the performance score may be normalized to account for the sample errors. Lastly, a relative performance score may be further computed based on the computed performance score and the entropy of the prior knowledge of the probability distribution forecast.

DETAILED DESCRIPTION

The systems and method disclosed herein rely in different capacities on scoring and manipulating probability distributions. These probability distributions may correspond to any set of financial, business, weather, or other data. The probability distributions may be forecasts or predictions of a given probability distribution, actual realizations of a probability distributions, or prior knowledge of a given probability distribution, which may also comprise a reference probability distribution. The probability distributions may be stored either as continuous probability density functions, as discretized probability mass functions stored in vectors, or as samples that correspond to the probability distribution. It should be understood that the probability distributions may also be stored in other manners without departing from the scope of the present disclosure.

Throughout this detailed description, multiple equations are used to illustrate potential embodiments of the system disclosed herein. To aid in understanding these exemplary equations, Table 1 below sets out definitions for terms used in the equations.

TABLE 1

| Term | Definition |
|---|---|
| K | Number of bins in a given probability distribution, or a number of possible outcomes |
| N | Total number of realized samples or total number of forecasts |
| $M_k$ | Total number of forecasts for the k-th bin. |
| $f_k$ | Forecast probability (frequency) for k-th bin |
| $f_{nk}$ | Forecast probability (frequency) for the k-th bin at the n-th sample |
| $p_k$ | Realized probability (frequency) for the k-th bin |
| $\bar{o}_k$ | Observed frequency for the k-th bin; i.e., an empirical ex post estimate of $p_k$ |
| $o_{nk}$ | For the n-th sample, if it falls in the k-th bin, $o_{nk} = 1$; otherwise, $o_{nk} = 0$ |
| $\bar{o}_{k|p}$ | Observed frequency for the k-th bin, according to a bin division of p |
| $q_k$ | Prior knowledge for the k-th bin, or a reference probability distribution used as the prior knowledge |
| f, p, $\bar{o}$, q | The probability density functions with the definitions as described above (i.e., f—forecast, p—realization, $\bar{o}$—observed realization, estimate, and q—prior knowledge) |
| f, p, $\bar{o}$, q | Vectors representing the probability mass functions with the definitions as described above (i.e., the discretized version of the probability density functions f, p, $\bar{o}$, q with a certain bin division) |

Those skilled in the art will understand that these exemplary equations are not the only way to implement embodiments of the system disclosed herein, and various changes and modifications to the preferred embodiments will be apparent to them. Such changes and modifications can be made without departing from the spirit and scope of the present subject matter and without diminishing its intended advantages. It is therefore intended that such changes and modifications be covered by the appended claims.

Figure 1:
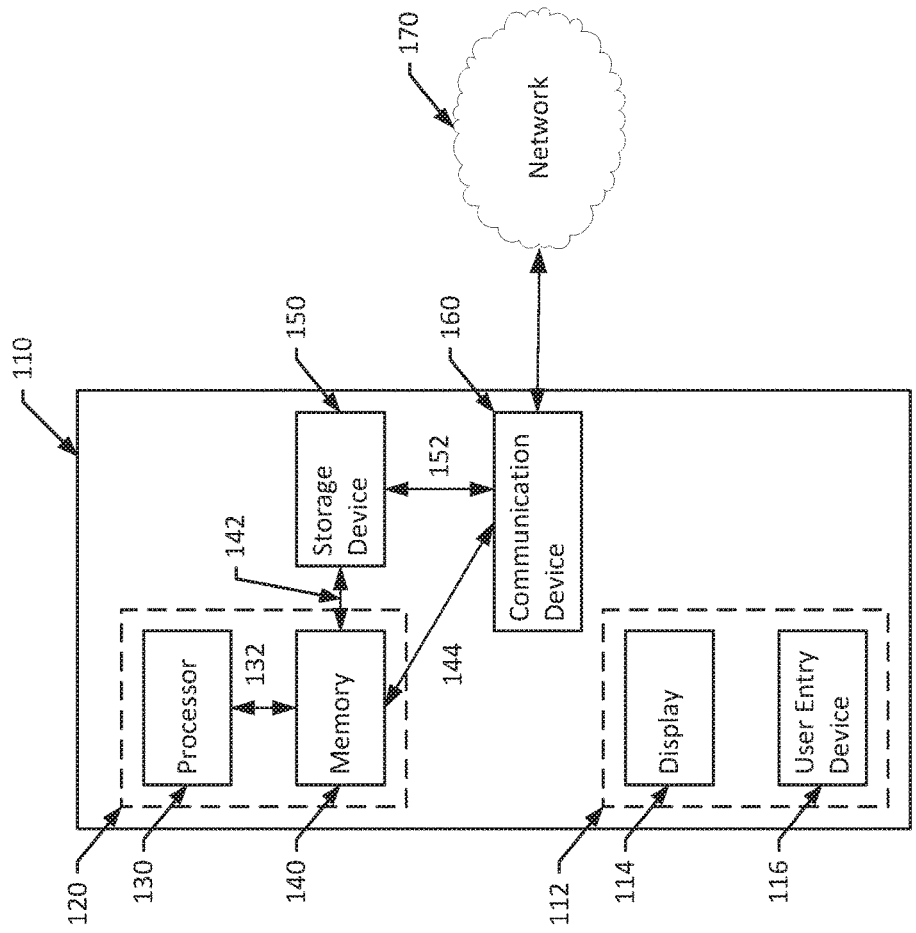
FIG. 1 is a schematic diagram of an example implementation of the presently described probability distribution forecast evaluation system.

FIG. 1 is a schematic diagram of an example implementation 100 of the system described herein. The example implementation 100 includes a probability distribution forecast evaluation system 110. The probability distribution forecast evaluation system 110 includes an analysis module 120 comprising a processor 130 coupled to a memory 140. The analysis module 120 is coupled to a storage device 150 via link 142 and a communication device via link 144. The storage device 150 is further connected to the communication device 160 via link 152. The communication device connects the probability distribution forecast evaluation system 110 to the network 170 via link 162. The probability distribution forecast evaluation system 110 further includes a user interface device 112, which includes a display 114 and a user entry device 116.

The user interface device 112 may consist of a display 114 implemented as a computer monitor and a user entry device 116 implemented as one or more of a computer mouse, keyboard, voice recognition system, touch screen device, or other similar computer input device. In an alternative embodiment not depicted in FIG. 1, the user interface device 112 may be implemented as a physically separate device that connects to the probability distribution system 110 via the network 170 and link 162. For example, the user interface 112 could be a separate computing device such as a laptop, desktop computer, smartphone, or tablet. In this case, the display 114 may include a computer display, smartphone display, or tablet display and the user entry device may include a smartphone or tablet touchscreen, voice recognition system, or keyboard. In still other embodiments, the probability distribution forecast evaluation system 110 may not include any user interface.

The network 170 may be implemented as a local, closed network, or may include one or more connections to the Internet. The link 162 may be implemented as a wired connection, or as a wireless connection such as Wi-Fi, Bluetooth, 4G/LTE, or any other wireless protocol. The storage device 150 may be implemented as any for of data storage device. For example, the storage device 150 may be implemented as one or more of a hard disk drive (HDD), solid state drive (SSD), flash-based storage, read-only memory (ROM). The storage device 150 may be coupled to the communication device 160 via link 152 to receive information or data from the network 170. The storage device may store one or more of a probability distribution forecast, a realization of a probability distribution forecast, and a prior knowledge of the of the probability distribution forecast. This information may be stored either as a continuous forecast and may also or alternatively be stored as a set of empirical samples.

The processor 130 may be configured to perform a series of instructions that are stored in the memory 140. The memory 140 may be implemented as one or more random access memories (RAMs). Although depicted in the singular, the processor 130 may be implemented as one or more computer processing units (CPUs). As discussed in greater detail below, the memory 140 may contain a series of instructions that, when executed by the processor 130, cause the processor 130 to acquire one or more of a probability distribution forecast, a probability distribution realization corresponding to the probability distribution forecast, and a prior knowledge of the probability distribution forecast; compute an accuracy score based on the one or more of a probability distribution forecast, a probability distribution realization corresponding to the probability distribution forecast, and a prior knowledge of the probability distribution forecast; compute an information score based on the one or more of a probability distribution forecast, a probability distribution realization corresponding to the probability distribution forecast, and a prior knowledge of the probability distribution forecast; and compute a performance score based on the accuracy score and the information score.

Figure 2:
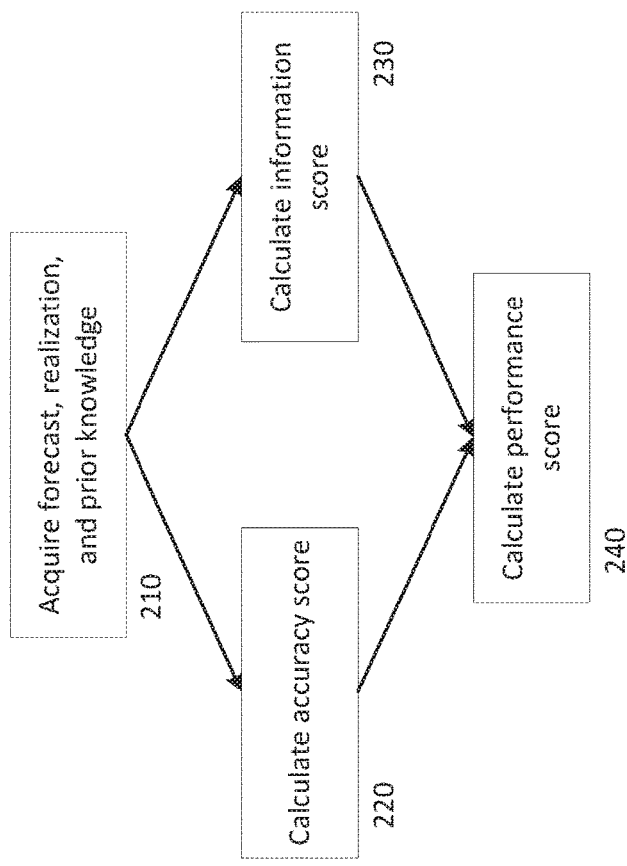
FIG. 2 is a flowchart of an example method for implementing the presently described probability distribution forecast evaluation system.

FIG. 2 depicts a flowchart of an example method 200 for implementing the system described herein. In some embodiments, the method 200 is an implementation of the probability distribution forecast evaluation system 110. For example, the method 200 may be implemented as a series of instructions stored on the memory 140 that cause the processor 130 to perform the method 200 when executed.

Starting at step 210, the method 200 acquires a probability distribution forecast ("forecast"), a probability distribution realization corresponding to the probability distribution forecast ("realization"), and a prior knowledge of the probability distribution forecast ("prior knowledge"). In some embodiments, the method 200 may not acquire all three of the forecast, realization, and prior knowledge. Instead, it may only acquire a subset, such as just the forecast or both of the forecast and the prior knowledge. The forecast, realization, and prior knowledge may be user entered, such as through the user interface 112; may be stored, such as in storage device 150; or may be looked up, downloaded, or acquired over a network, such as network 170. The system disclosed herein contemplates that each of the forecast, realization, and prior knowledge are acquired by different means. For example, the forecast may be user entered, the realization may be downloaded from the Internet, and the prior knowledge may be stored on a storage device.

The forecast may be a stored version of a previously-recorded forecast of a statistical probability distribution forecast. The forecast may predict metrics in one or more areas such as financial metrics, economic metrics, business performance metrics, weather metrics, or any other metric that may be useful to predict. The realization may be a stored version of the realized probability distribution of the metrics that the forecast predicted. The prior knowledge may be a stored version of prior knowledge about the probability distribution that the forecast predicted. For example, this may be a reference probability distribution for the forecast.

Each of the forecast, realization, and prior knowledge may be stored as a probability density function, a probability mass function, or a collection of samples. Further, the forecast, realization, and prior knowledge may be partitioned into one or more bins. Each of the forecast, realization, and prior knowledge may have a different number of bins. Further, each of the forecast, realization, and prior knowledge may be stored in a different function. For example, the forecast and prior knowledge may be stored as a probability density function and the realization may be stored as a collection of samples.

Once the forecast, realization, and prior knowledge are acquired, at step 220 the method 200 progresses to calculate an accuracy score for the forecast. The accuracy score shows how reliable a forecast is, measuring how reliably the forecast predicts the probability distribution. This measure is important to evaluating a probability distribution forecast because accuracy is an important component of a useful forecast.

The accuracy score may be based on the forecast and the realization. In some embodiments, the accuracy score is calculated by computing a dissimilarity score between the forecast and the realization. A dissimilarity score may be a measurement of how different two sets of data are. For example, the accuracy score may be calculated by calculating the Kullback-Leibler (KL) divergence between the forecast and the realization, as shown below:

$$ACC = D_{KL}(f \| p) = \sum_{k=1}^{K} f_k \log \frac{f_k}{p_k}$$

This implementation of the accuracy score will be lower when a forecast is more accurate.

In other embodiments, the accuracy score may be calculated using a quadratic approximation of the KL divergence between the forecast and the realization. For example, if the accuracy score is calculated based on samples of one or more of the forecast and the realization, it may be useful to calculate the accuracy score using the quadratic approximation of the KL divergence between the samples of the forecast and the realization. Those skilled in the art will recognize that the KL divergence between the samples of the forecast and the realization can be approximated with chi-squared statistics using a quadratic approximation as shown below:

$$ACC = \sum_{k=1}^{K} \frac{(f_k - \bar{o}_k)^2}{f_k}$$

In this instance, if only one of the forecast and the realization is stored as samples, the other may be converted to samples by partitioning it into bins. For example, if the realization distribution is stored as samples, the forecast may be partitioned into bins. In some embodiments, it may be preferable to convert the distribution that was not sampled into the same number of bins as the sampled distribution. In the preceding situation, for example, if the realization distribution is stored as a set of samples in 5 bins, the forecast may be partitioned into 5 bins. In other cases, if neither the forecast nor the realization is stored as samples, the system of the present disclosure may convert both distributions by partitioning them into bins. As described above, it may be beneficial to partition both distributions into the same number of bins.

At step 230, the method 200 calculates an information score for the forecast. The information score measures the amount of information a forecast contains compared to the prior knowledge about the forecasted metrics. This prior knowledge may include reference probability distributions for the forecasted metrics. The information score is an important part of evaluating forecasts. Conventional techniques, such as the Brier score, treat more certainty (or a better accuracy score) as the better forecast. Such systems fail to properly account for the amount of information in a forecast. For example, even if a forecast is less certain than the prior knowledge, it is still useful to know that the future is more uncertain than the prior knowledge. As a further example, an area may get rain on 30% of the days over the course of the year. However, a forecast that predicted a 30% chance of rain for every day might be very accurate over the course of the year, but it does not contain any information and is therefore not very useful. On the other hand, a forecast that predicts a 90% chance of rain on days when it only rains 80% of the time might not be that accurate, but it does contain information about which days are more likely to receive rain and is therefore more useful. Accordingly, embodiments of the presently disclosed system incorporate an information score into its evaluation.

The information score may be based on the forecast and the prior knowledge. In some embodiments, the information score is calculated by computing a dissimilarity score between the forecast and the realization. For example, the information score may be calculated by calculating the KL divergence between the realization and the prior knowledge, as shown below:

$$INFO = D_{KL}(q \| p) = \sum_{k=1}^{K} q_k \log \frac{f_k}{p_k}$$

This implementation of the information score will be higher when a forecast provides more information.

In some embodiments, the forecast may be a conditional distribution. In these cases, both the realization and the forecast may be conditional on the same condition. Similarly, the prior knowledge is generally either an unconditional distribution, or is conditional on a different condition from the forecast and the realization. In this instance, when the accuracy score is high, the forecast may be used as a proxy for the realization in the information score calculation. For example, the information score may be calculated as shown below:

$$INFO = \sum_{k=1}^{K} f_k \log \frac{f_k}{q_k}$$

In still further embodiments, the information score may be calculated using a quadratic approximation of the KL divergence between the realization and the prior knowledge. For example, if the accuracy score is calculated based on samples of one or more of the realization and the prior knowledge, it may be useful to calculate the information score using the quadratic approximation of the KL divergence between the samples of the realization and the prior knowledge. Those skilled in the art will recognize that the KL divergence between the samples of the realization and the prior knowledge can be approximated with chi-squared statistics using a quadratic approximation as shown below:

$$INFO = \sum_{k=1}^{K} \frac{(q_k - \overline{o}_k)^2}{q_k}$$

In similar embodiments to those discussed above, if the forecast is accurate (i.e., the accuracy score is small), the forecast may be used as a proxy for the realization in the information score calculation. In this instance, the information score can be calculated with the quadratic approximation of the KL divergence between the samples of the forecast and the prior knowledge as shown below:

$$INFO = \sum_{k=1}^{K} \frac{(q_k - f_k)^2}{f_k}$$

In this instance, if only one of the prior knowledge and the realization is stored as samples, the other may be converted to samples by partitioning it into bins. For example, if the realization distribution is stored as samples, the forecast may be partitioned into bins. In some embodiments, it may be preferable to convert the distribution that was not sampled into the same number of bins as the sampled distribution. In the preceding situation, for example, if the realization distribution is stored as a set of samples in 5 bins, the prior knowledge may be partitioned into 5 bins. In other cases, if neither the prior knowledge nor the realization is stored as samples, the disclosed system may convert both distributions by partitioning them into bins. As described above, it may be beneficial to partition both distributions into the same number of bins.

After calculating the accuracy and information scores, at step 240, the method 200 calculates a performance score based on the accuracy score and the information score. In some embodiments, the performance score is calculated by subtracting the accuracy score from the information score, as shown below:

$$PS = INFO - ACC$$

When defined like this, the larger the performance score is, the better the forecast is. One benefit of this implementation is that the accuracy score and information score can be calculated independently. This means that, the number of bins used in the accuracy score calculation can differ from the number of bins used in the information score calculation. This improves the simplicity and numerical stability of the calculation.

Similarly, the above implementation of the performance score calculation does not depend on how each of the information score and the accuracy score are calculated. Accordingly, this implementation may be used even if the accuracy score and information score are calculated based on samples or if the information score is calculated by using the forecast as a proxy for the realization as discussed above. In fact, in some embodiments it may be preferable to use the forecast as a proxy for the realization in the information score calculation. Doing this may result in a simplified, and therefore faster, calculation. Calculating the performance score in this manner may also be more robust if one or more of the forecast, prior knowledge, and realization is stored as samples. An example implementation of this is shown below:

$$PS = INFO - ACC$$
$$= \sum_{k=1}^{K} f_k \log \frac{f_k}{q_k} - \sum_{k=1}^{K} f_k \log \frac{f_k}{q_k}$$
$$= \sum_{k=1}^{K} f_k \log \frac{p_k}{q_k}$$

In some embodiments, after calculating the performance score, the method 200 will also calculate a relative performance score (not depicted in FIG. 2). The relative performance score may be calculated based on the entropy of the prior knowledge. In some embodiments, the entropy of the prior knowledge may be calculated as defined below:

$$HQ = -\sum_{k=1}^{K} q_k \log q_k = \log K - D_{KL}(q \| u)$$

where u represents a uniform distribution, i.e., $u_k = 1/K$.

In still further embodiments, after calculating the performance score, the method 200 will also calculate a confidence interval for the performance score. The confidence interval for the performance score may be based on the probability distribution of the performance score. For example, in some embodiments, those with skill in the art will note that one or more of the accuracy score and the information score may have a probability distribution if calculated based on samples. Accordingly, a probability distribution of the performance score may be calculated based on one or more of the probability distribution of the accuracy score and the probability distribution of the information score. The confidence interval for the performance score may then be calculated based on the probability distribution of the performance score. In practice, the confidence interval of the performance score may be valuable because it provides more information on the range of values that the performance score may take. This provides users with a greater understanding of the performance of the forecast.

The previously-discussed example embodiments of the method 200 focus primarily on analyzing a single forecast at a time. However, the present disclosure also contemplates that the method 200 may also analyze multiple forecasts, where each of the multiple forecasts may differ from one another. In addition, one or more of the prior knowledge and realization could be different for one or more of the multiple forecasts as well. In some embodiments, each of the forecasts may use different bin divisions and the prior knowledge and realization that correspond to each of the forecasts may also use different bin divisions. For example, if the multiple forecasts use different bin divisions, the prior knowledge and realization that correspond to each of the multiple forecasts may use the same division as their corresponding forecast.

In some embodiments, the method 200 may select bin divisions for each distribution such that the probability bins of the multiple forecasts are the same. In such embodiments, the accuracy and information scores may be calculated as defined below:

$$ACC = \sum_{k=1}^{K} \frac{(f_k - \overline{o}_{k|f})^2}{f_k}$$

$$INFO = \sum_{k=1}^{K} \frac{(q_k - \overline{o}_{k|q})^2}{q_k}$$

In the above embodiment, the method 200 may use the forecast as a proxy for the realization in the information score calculation as described above. For example, the information score may be calculated as shown below:

$$INFO = \sum_{k=1}^{K} \frac{(q_{k|f} - f_k)^2}{f_k}$$

In still further embodiments, the method 200 may select equal quantiles for both the prior knowledge and the realization. In this case, the performance score may be calculated as defined below:

$$PS = K \sum_{k=1}^{K} (q_k - \overline{o}_{k|q})^2 - K \sum_{k=1}^{K} (f_k - \overline{o}_{f|k})^2$$

$$= K \left[ \sum_{k=1}^{K} \left( \frac{1}{K} - \overline{o}_{k|q} \right)^2 - \sum_{k=1}^{K} \left( \frac{1}{K} - \overline{o}_{k|f} \right)^2 \right]$$

In the above embodiment, the method 200 may use the forecast as a proxy for the realization in the information score calculation as described above. In such an embodiment, the performance score may be calculated as shown below:

$$PS = K \sum_{k=1}^{K} (q_{k|f} - f_k)^2 - K \sum_{k=1}^{K} (f_k - \overline{o}_{k|f})^2$$

$$= K \left[ \sum_{k=1}^{K} \left( \frac{1}{K} - q_{k|f} \right)^2 - \sum_{k=1}^{K} \left( \frac{1}{K} - \overline{o}_{k|f} \right)^2 \right]$$

In some cases, it may impractical or impossible to divide the multiple forecasts and their corresponding realizations and prior knowledge into bins with a constant size. For example, it may be impossible to keep bins of a constant size if the outcome is binary. Thus, in some embodiments, the method 200 may calculate the information and accuracy scores as shown below:

$$INFO = \frac{1}{N} \sum_{n=1}^{N} \sum_{k=1}^{K} \frac{(q_{nk} - o_{nk|q})^2}{q_{nk}}$$

$$ACC = \frac{1}{N} \sum_{n=1}^{N} \sum_{k=1}^{K} \frac{(f_{nk} - o_{nk|f})^2}{f_{nk}}$$

In the above embodiment, the method 200 may use the forecast as a proxy for the realization in the information score calculation as described above. In such an embodiment, the information score may be calculated as shown below:

$$INFO = \frac{1}{N} \sum_{n=1}^{N} \sum_{k=1}^{K} \frac{(q_{nk} - f_{nk})^2}{f_{nk}}$$

In similar embodiments, the method 200 may substitute the denominator in the above calculations for 1/K, resulting in the simplified calculations shown below:

$$INFO = \frac{K}{N} \sum_{n=1}^{N} \sum_{k=1}^{K} (q_{nk} - o_{nk|q})^2$$

$$ACC = \frac{K}{N} \sum_{n=1}^{N} \sum_{k=1}^{K} (f_{nk} - o_{nk|f})^2$$

In the above embodiment, the method 200 may use the forecast as a proxy for the realization in the information score calculation as described above. In such an embodiment, the information score may be calculated as shown below:

$$INFO = \frac{K}{N} \sum_{n=1}^{N} \sum_{k=1}^{K} (q_{nk} - f_{nk})^2$$

In some embodiments, after calculating the performance score for the multiple forecasts, the method 200 may also calculate a relative performance score for the multiple forecasts. The relative performance score for the multiple forecasts may be calculated based on the entropy of the prior knowledge corresponding to the multiple forecasts.

The invention is claimed as follows:

1. A probability distribution forecast evaluation system comprising
    at least one processor;
    at least one memory device that stores a plurality of instructions which, when executed by the at least one processor, cause the at least one processor to operate with the at least one memory device to:
        acquire a probability distribution forecast, a probability distribution realization corresponding to the probability distribution forecast, and a prior knowledge of the probability distribution forecast;
        compute an accuracy score based on one or more of the probability distribution forecast, the probability distribution realization corresponding to the probability distribution forecast, and the prior knowledge of the probability distribution forecast;
        compute an information score based on the probability distribution forecast and the prior knowledge of the probability distribution forecast; and
        compute a performance score based on the accuracy score and the information score.

2. The probability distribution forecast evaluation system of claim 1, wherein the accuracy score is computed based on the probability distribution forecast and the probability distribution realization.

3. The probability distribution forecast evaluation system of claim 2, wherein the accuracy score is computed by calculating a dissimilarity score between the probability distribution forecast and the probability distribution realization.

4. The probability distribution forecast evaluation system of claim 3, wherein the dissimilarity score is either (1) the Kullback-Leibler (KL) divergence between the probability distribution forecast and the probability distribution realization, or (2) a quadratic approximation of the KL divergence between the probability distribution forecast and the probability distribution realization.

5. The probability distribution forecast evaluation system of claim 1, wherein the information score is computed based on the probability distribution realization and the prior knowledge of the probability distribution forecast.

6. The probability distribution forecast evaluation system of claim 5, wherein the information score is computed by calculating a dissimilarity score between the probability distribution realization and the prior knowledge of the probability distribution forecast.

7. The probability distribution forecast evaluation system of claim 6, wherein the dissimilarity score is either (1) the Kullback-Leibler (KL) divergence between the probability distribution realization and the prior knowledge of the probability distribution forecast, or (2) a quadratic approximation of the KL divergence between the probability distribution realization and the prior knowledge of the probability distribution forecast.

8. The probability distribution forecast evaluation system of claim 1, wherein the performance score is computed by subtracting the accuracy score from the information score.

9. The probability distribution forecast evaluation system of claim 1, wherein one or more of the probability distribution forecast, the probability distribution realization corresponding to the probability distribution forecast, and the prior knowledge of the probability distribution forecast are computed based on samples.

10. The probability distribution forecast evaluation system of claim 9, wherein one or more of the probability distribution forecast, the probability distribution realization corresponding to the probability distribution forecast, and the prior knowledge of the probability distribution forecast are partitioned into discrete probability bins.

11. The probability distribution forecast evaluation system of claim 9, wherein one or more of the probability distribution forecast, the probability distribution realization corresponding to the probability distribution forecast, and the prior knowledge of the probability distribution forecast contain sample errors and the performance score is normalized to account for the sample errors.

12. The probability distribution forecast evaluation system of claim 1, wherein a relative performance score is further computed based on the computed performance score and the entropy of the prior knowledge of the probability distribution forecast.

13. The probability distribution forecast evaluation system of claim 1, further comprising instructions that, when executed by the at least one processor, cause the at least one processor to operate with the at least one memory device to:
    calculate a probability distribution for the performance score based on one or more of the probability distribution of the accuracy score and the probability distribution of the information score; and
    calculate a confidence interval of the performance score based on the probability distribution of the performance score.

14. A method for evaluating a probability distribution forecast comprising:
    acquiring a probability distribution forecast, a probability distribution realization corresponding to the probability distribution forecast, and a prior knowledge of the probability distribution forecast;
    computing an accuracy score based on one or more of the probability distribution forecast, the probability distribution realization corresponding to the probability distribution forecast, and the prior knowledge of the probability distribution forecast;
    computing an information score based on the probability distribution forecast and the prior knowledge of the probability distribution forecast; and
    computing a performance score based on the accuracy score and the information score.

15. The method for evaluating a probability distribution forecast of claim 14, wherein the accuracy score is computed based on the probability distribution forecast and the probability distribution realization.

16. The method for evaluating a probability distribution forecast of claim 15, wherein the accuracy score is computed by calculating a dissimilarity score between the probability distribution forecast and the probability distribution realization.

17. The method for evaluating a probability distribution forecast of claim 16, wherein the dissimilarity score is either (1) the Kullback-Leibler (KL) divergence between the probability distribution forecast and the probability distribution realization, or (2) a quadratic approximation of the KL divergence between the probability distribution forecast and the probability distribution realization.

18. The method for evaluating a probability distribution forecast of claim 14, wherein the information score is computed based on the probability distribution realization and the prior knowledge of the probability distribution forecast.

19. The method for evaluating a probability distribution forecast of claim 18, wherein the information score is computed by calculating a dissimilarity score between the probability distribution realization and the prior knowledge of the probability distribution forecast.

20. The method for evaluating a probability distribution forecast of claim 19, wherein the dissimilarity score is either (1) the Kullback-Leibler (KL) divergence between the probability distribution realization and the prior knowledge of the probability distribution forecast, or (2) a quadratic approximation of the KL divergence between the probability distribution realization and the prior knowledge of the probability distribution forecast.

21. The method for evaluating a probability distribution forecast of claim 14, wherein the performance score is computed by subtracting the accuracy score from the information score.

22. The method for evaluating a probability distribution forecast of claim 14, wherein one or more of the probability distribution forecast, the probability distribution realization corresponding to the probability distribution forecast, and the prior knowledge of the probability distribution forecast are computed based on samples.

23. The method for evaluating a probability distribution forecast of claim 22, wherein one or more of the probability distribution forecast, the probability distribution realization corresponding to the probability distribution forecast, and the prior knowledge of the probability distribution forecast are partitioned into discrete probability bins.

24. The method for evaluating a probability distribution forecast of claim 22, wherein one or more of the probability distribution forecast, the probability distribution realization corresponding to the probability distribution forecast, and the prior knowledge of the probability distribution forecast contain sample errors and the performance score is normalized to account for the sample errors.

25. The method for evaluating a probability distribution forecast of claim 14, wherein a relative performance score is further computed based on the computed performance score and the entropy of the prior knowledge of the probability distribution forecast.

26. The method for evaluating a probability distribution forecast of claim 14, further comprising:
    calculating a probability distribution for the performance score based on one or more of the probability distribution of the accuracy score and the probability distribution of the information score; and
    calculating a confidence interval of the performance score based on the probability distribution of the performance score.

* * * * *